(12) United States Patent
Zhu et al.

(10) Patent No.: US 12,521,544 B2
(45) Date of Patent: Jan. 13, 2026

(54) DRIVING APPARATUS AND BLOOD PUMP

(71) Applicant: SHENZHEN CORE MEDICAL TECHNOLOGY CO., LTD, Guangdong (CN)

(72) Inventors: Yicheng Zhu, Shenzhen (CN); Shunzhou Yu, Shenzhen (CN)

(73) Assignee: SHENZHEN CORE MEDICAL TECHNOLOGY CO., LTD, Guangdong (CN)

( * ) Notice: Subject to any disclaimer, the term of this patent is extended or adjusted under 35 U.S.C. 154(b) by 0 days.

(21) Appl. No.: 18/707,419

(22) PCT Filed: Jun. 5, 2023

(86) PCT No.: PCT/CN2023/098349
§ 371 (c)(1),
(2) Date: May 3, 2024

(87) PCT Pub. No.: WO2024/007792
PCT Pub. Date: Jan. 11, 2024

(65) Prior Publication Data
US 2025/0032772 A1    Jan. 30, 2025

(30) Foreign Application Priority Data
Jul. 8, 2022    (CN) .......................... 202210800319.7

(51) Int. Cl.
*A61M 60/216*    (2021.01)
*A61M 60/13*    (2021.01)
(Continued)

(52) U.S. Cl.
CPC .......... *A61M 60/216* (2021.01); *A61M 60/13* (2021.01); *A61M 60/139* (2021.01);
(Continued)

(58) Field of Classification Search
CPC .. A61M 60/216; A61M 60/13; A61M 60/139; A61M 60/221; A61M 60/416;
(Continued)

(56) References Cited

U.S. PATENT DOCUMENTS

| | | |
|---|---|---|
| 5,211,546 A | 5/1993 | Isaacson et al. |
| 5,507,629 A | 4/1996 | Jarvik |

(Continued)

FOREIGN PATENT DOCUMENTS

| | | |
|---|---|---|
| CN | 104514726 A | 4/2015 |
| CN | 105612680 A | 5/2016 |

(Continued)

OTHER PUBLICATIONS

International Search Report issued for International Patent Application No. PCT/CN2023/098349, Date of mailing: Sep. 24, 2023, 5 pages including English translation.

(Continued)

*Primary Examiner* — Audrey B. Walter
(74) *Attorney, Agent, or Firm* — HSML P.C.

(57) ABSTRACT

Provided are a driving apparatus and a blood pump. The driving apparatus comprises a housing assembly, a rotating shaft, a rotor, a thrust member, and a stator. The housing assembly is provided with a limiting surface; the rotating shaft is rotatably mounted on the housing assembly; the rotor is fixedly connected to the rotating shaft; the thrust member is fixedly connected to at least one of the rotating shaft and the rotor, the thrust member, the limiting surface and the rotor are arranged in the axial direction of the rotating shaft, the thrust member is located between the limiting surface and the rotor, and the thrust member can abut against the limiting surface; the stator can generate a magnetic thrust on the rotor such that the thrust member abuts against the limiting surface.

20 Claims, 8 Drawing Sheets

(51) Int. Cl.
*A61M 60/139* (2021.01)
*A61M 60/221* (2021.01)
*A61M 60/416* (2021.01)
*A61M 60/422* (2021.01)
*A61M 60/802* (2021.01)
*A61M 60/81* (2021.01)
*A61M 60/825* (2021.01)
*A61M 60/857* (2021.01)
*F04D 25/06* (2006.01)

(52) U.S. Cl.
CPC ........ *A61M 60/221* (2021.01); *A61M 60/416* (2021.01); *A61M 60/422* (2021.01); *A61M 60/802* (2021.01); *A61M 60/81* (2021.01); *A61M 60/825* (2021.01); *A61M 60/857* (2021.01); *F04D 25/0606* (2013.01)

(58) Field of Classification Search
CPC .. A61M 60/422; A61M 60/802; A61M 60/81; A61M 60/825; A61M 60/857; F04D 25/0606

See application file for complete search history.

(56) References Cited

U.S. PATENT DOCUMENTS

| | | | |
|---|---|---|---|
| 6,176,848 | B1 | 1/2001 | Rau et al. |
| 7,011,620 | B1 | 3/2006 | Siess |
| 2007/0231135 | A1 | 10/2007 | Wampler et al. |
| 2012/0245680 | A1 | 9/2012 | Masuzawa et al. |
| 2015/0051436 | A1* | 2/2015 | Spanier ............. A61M 60/13 600/16 |
| 2017/0063195 | A1 | 3/2017 | Li et al. |
| 2019/0209752 | A1 | 7/2019 | Nyikos et al. |
| 2020/0121835 | A1 | 4/2020 | Farago et al. |
| 2023/0310834 | A1* | 10/2023 | Yu ................. A61M 60/13 |

FOREIGN PATENT DOCUMENTS

| | | |
|---|---|---|
| CN | 207124526 U | 3/2018 |
| CN | 111412151 A | 7/2020 |
| CN | 111840683 A | 10/2020 |
| CN | 112106155 A | 12/2020 |
| CN | 112107749 A | 12/2020 |
| CN | 112261968 A | 1/2021 |
| CN | 112334182 A | 2/2021 |
| CN | 112436697 A | 3/2021 |
| CN | 112472999 A | 3/2021 |
| CN | 112494803 A | 3/2021 |
| CN | 112689716 A | 4/2021 |
| CN | 215025224 U | 12/2021 |
| CN | 215653408 U | 1/2022 |
| CN | 114344701 A | 4/2022 |
| CN | 216356340 U | 4/2022 |
| CN | 114652952 A | 6/2022 |
| CN | 115025387 A | 9/2022 |
| JP | 2015508678 A | 3/2015 |
| JP | 2022545590 A | 10/2022 |
| JP | 2023511326 A | 3/2023 |
| KR | 101457816 B1 | 11/2014 |
| WO | 9729795 A1 | 8/1997 |
| WO | 2022021798 A1 | 2/2022 |
| WO | 2022134956 A1 | 6/2022 |

OTHER PUBLICATIONS

Written Opinion issued for International Patent Application No. PCT/CN2023/098349, Date of mailing: Sep. 24, 2023, 6 pages including English machine translation.

Extended European Search Report issued for European Patent Application No. 23834566.4, dated Sep. 10, 2025, 13 pages.

* cited by examiner

DRIVING APPARATUS AND BLOOD PUMP

CROSS-REFERENCE TO RELATED APPLICATIONS

This application is an U.S. national phase application under 35 U.S.C. § 371 based upon international patent application No. PCT/CN2023/098349, filed on Jun. 5, 2023, which itself claims priority of Chinese Patent Application No. CN202210800319.7, filed on Jul. 8, 2022. The contents of the above identified applications are hereby incorporated herein in their entireties by reference.

TECHNICAL FIELD

The present disclosure relates to the technical field of medical devices, and in particular to a driving device and a blood pump having the same.

BACKGROUND

Intravascular blood pump is a blood pumping device that can be inserted into a patient's heart through the patient's blood vessels. The intravascular blood pump is placed in an opening of a heart valve, so that blood can flow through the blood pump and into an arterial blood vessels. The blood pump includes a driving portion and an impeller. The driving portion has a stationary portion and a rotating portion that rotates relative to the stationary portion. The impeller is fixedly connected to the rotating portion, and the impeller is driven to rotate through the rotating portion. However, there is great wear between the stationary portion and the rotating portion, and the rotating portion moves unstably, which affects the service life and reliability of the blood pump.

SUMMARY

Accordingly, the present disclosure provides a driving device and a blood pump with a long service life and relatively reliable performance.

An embodiment of a first aspect of the present disclosure provides a driving device configured to drive an impeller to rotate, the driving device including:
  a housing assembly comprising a limiting surface;
  a rotating shaft rotatably mounted to the housing assembly and fixedly connected to the impeller;
  a rotor fixedly connected to the rotating shaft;
  a thrust member fixedly connected to at least one of the rotating shaft and the rotor, wherein the thrust member, the limiting surface, and the rotor are arranged along an axial direction of the rotating shaft, the thrust member is located between the limiting surface and the rotor, and the thrust member is configured to abut against the limiting surface; and
  a stator configured to drive the rotor to rotate, wherein the stator is capable of generating a magnetic thrust force against the rotor, and the magnetic thrust force enables the thrust member to abut against the limiting surface.

An embodiment of a second aspect of the present disclosure provides a blood pump, including an impeller and any one of the foregoing driving devices. The impeller is fixedly connected to the rotating shaft, and the rotating shaft is configured to drive the impeller to rotate.

Details of one or more embodiments of the present disclosure are set forth in the following accompanying drawings and descriptions. Other features, objectives, and advantages of the present disclosure will become obvious with reference to the specification, the accompanying drawings, and the claims.

BRIEF DESCRIPTION OF THE DRAWINGS

In order to more clearly illustrate the technical solutions in embodiments of the present disclosure, the accompanying drawings to be used in the description of the embodiments or the prior art will be briefly introduced below. It is apparent that, the accompanying drawings in the following description are only some embodiments of the present disclosure, and other accompanying drawings can be obtained by those of ordinary skill in the art from the provided accompanying drawings without creative efforts.

DETAILED DESCRIPTION OF THE EMBODIMENTS

In order to make the objectives, technical solutions, and advantages of the present disclosure more clearly understood, the present disclosure is described in further detail below in conjunction with the accompanying drawings and embodiments. It should be understood that specific embodiments described herein are intended only to interpret the present disclosure and not intended to limit the present disclosure.

It should be noted that when one element is referred to as "fixed to" or "arranged on" another element, it may be directly disposed on the another element or an intermediate element may exist. When one element is considered to be "connected to" another element, it may be directly connected to the another element or indirectly connected to the another element.

In addition, the terms "first" and "second" are used for descriptive purposes only, which cannot be construed as indicating or implying a relative importance, or implicitly specifying the number of the indicated technical features. Thus, the features defined with "first" and "second" may explicitly or implicitly include one or more features. In the description of the present disclosure, "a plurality of" means two or more, unless specifically stated otherwise.

In order to illustrate the technical solutions of the present disclosure, description will be made below with reference to specific drawings and embodiments.

As used herein, "a proximal end" is defined as an end adjacent to an operator; and "a distal end" is defined as an end away from the operator.

Figure 1:
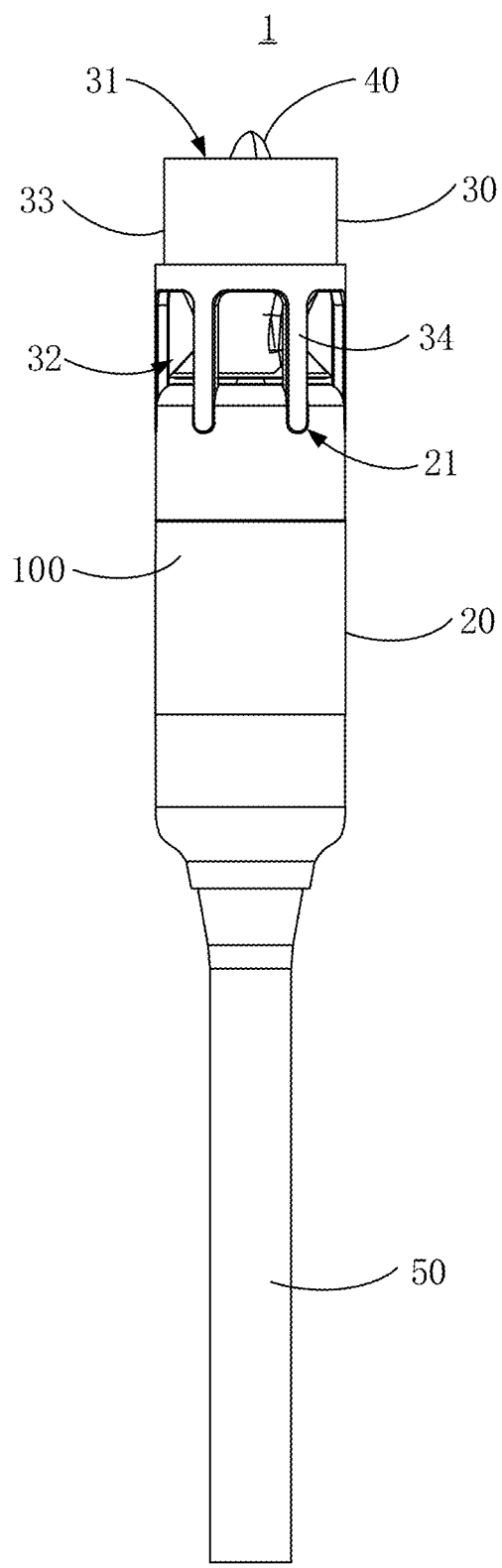
FIG. 1 is a perspective view of a blood pump according to a first embodiment.
Figure 2:
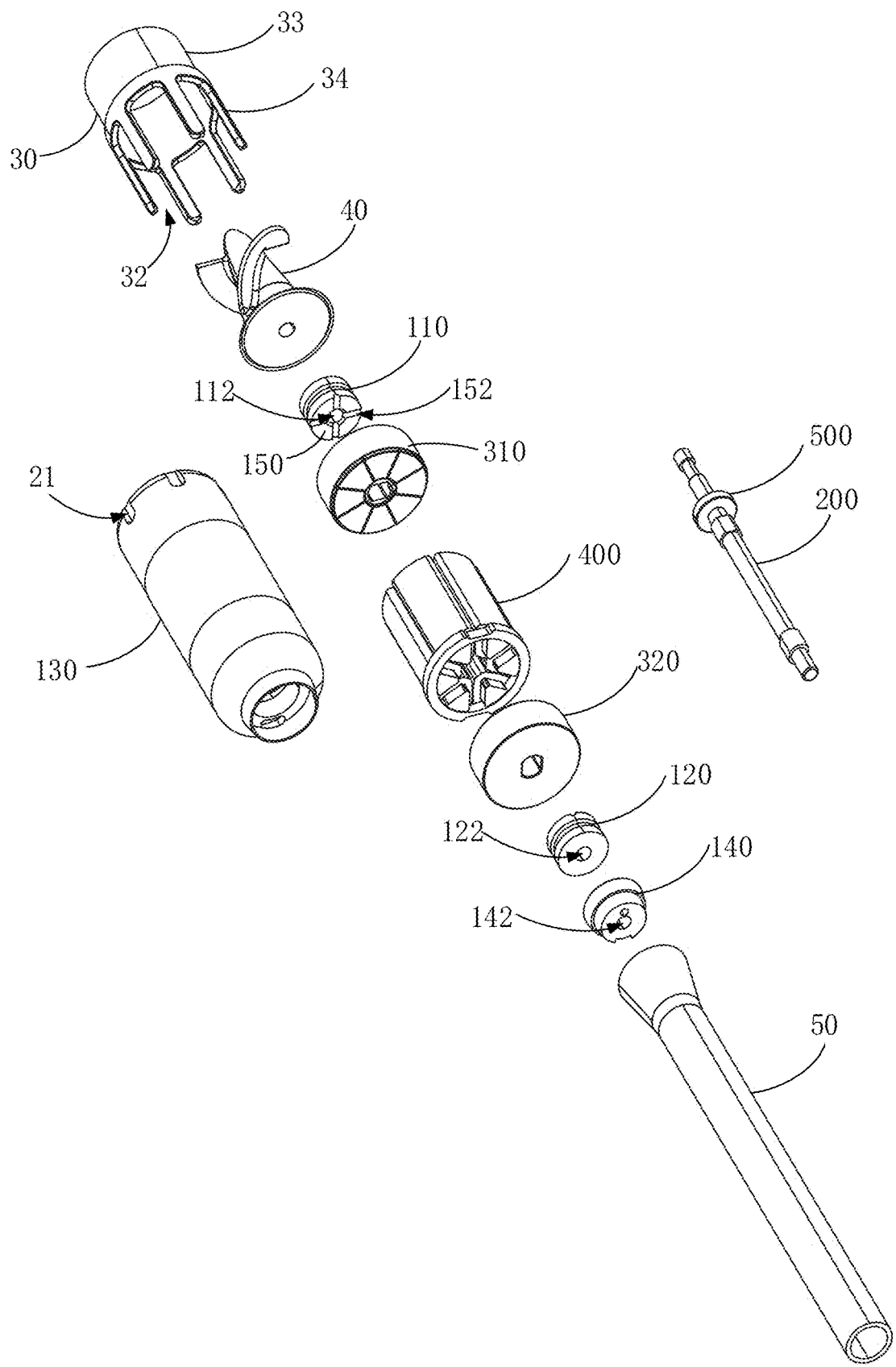
FIG. 2 is an exploded view of the blood pump shown in FIG. 1.

Referring to FIG. 1 and FIG. 2, a blood pump 1 according to a first embodiment includes a driving device 20, a cannula assembly 30, an impeller 40, and a catheter 50. The cannula assembly 30 is connected to a distal end of the driving device 20. The catheter 50 is connected to a proximal end of the driving device 20. The impeller 40 is rotatably provided in the cannula assembly 30. The impeller 40 is in transmission connection the driving device 20. The driving device 20 can drive the impeller 40 to rotate, so as to realize a blood pumping function of the blood pump 1.

Specifically, the cannula assembly 30 is provided with a liquid inlet 31 and a liquid outlet 32. The liquid outlet 32 is closer to the driving device 20 than the liquid inlet 31. That is, the liquid outlet 32 is located at a proximal end of the cannula assembly 30, and the liquid inlet 31 is located at a distal end of the cannula assembly 30. Specifically, the liquid outlet 32 is located on a sidewall of the cannula assembly 30. In one of the embodiments, the cannula assembly 30 extends through a heart valve, such as an aortic valve, while the liquid inlet 31 is located within a heart, and the liquid outlet 32 and the driving device 20 are located in a blood vessel outside the heart, such as an aorta. When the impeller 40 rotates, blood flows into the cannula assembly 30 from the liquid inlet 31, and then flows out of the cannula assembly 30 from the liquid outlet 32 to enter the blood vessel such as the aorta.

In some embodiments, the cannula assembly 30 includes a tube body 33 and a plurality of spaced inserting sheets 34 extending from one end of the tube body 33 along an axis of the tube body 33, and the liquid outlet 32 is formed between two adjacent inserting sheets 34. The driving device 20 is provided with sinking grooves 21, and ends of the inserting sheets 34 away from the tube body 33 are received in the sinking grooves 21. In the illustrated embodiment, numbers of the sinking grooves 21 and the inserting sheets 34 are equal, which form a one-to-one correspondence relationship. For a blood pump in which an axial length of the impeller 40 is short and a liquid guiding surface is formed at the distal end of the driving device 20 to ensure a hydraulic effect at the liquid outlet 32, the distal end of the driving device 20 is received in the cannula assembly 30, and the liquid guiding surface is located in the cannula assembly 30. In order to prevent an excessively large radial diameter of the driving device 20 and also ensure the hydraulic effect at the liquid outlet 32, a tube wall at an end of the cannula assembly 30 configured to sleeve with the driving device 20 may be very thin, which affects the connection strength between the cannula assembly 30 and the driving device 20. However, by using the above inserting sheets 34, the inserting sheets 34 may have greater thicknesses, so that the connection strength between the cannula assembly 30 and the driving device 20 is enhanced.

The catheter 50 is connected to an end of the driving device 20 away from the cannula assembly 30. The catheter 50 is configured to accommodate various supply lines. The supply lines may be, such as, a flushing line configured to introduce flushing fluid into the driving device 20, a wire configured to supply power to the driving device 20, a supporting member configured to support the catheter 50.

Figure 3:
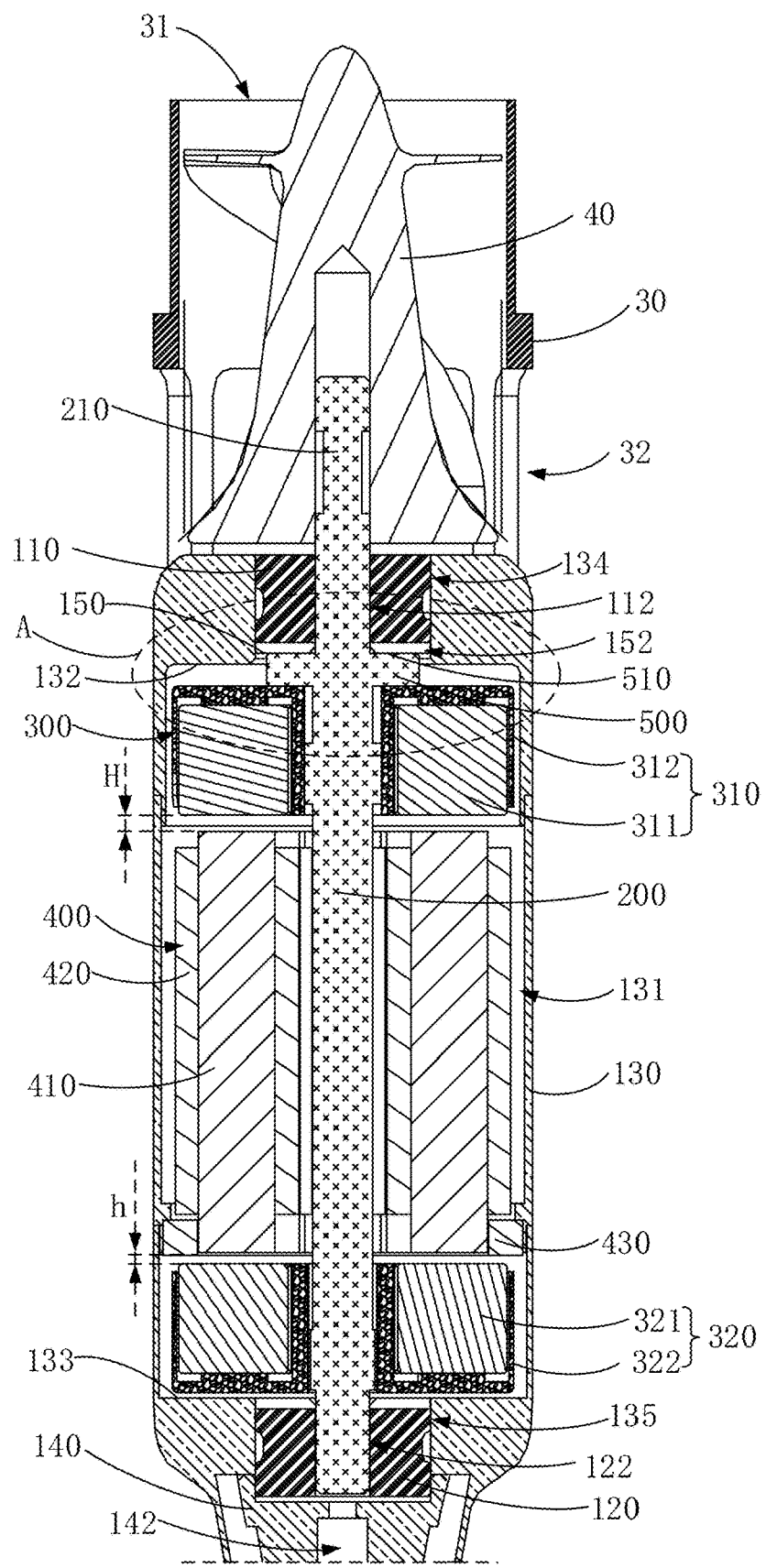
FIG. 3 is a partial cross-sectional view of the blood pump shown in FIG. 1.
Figure 4:
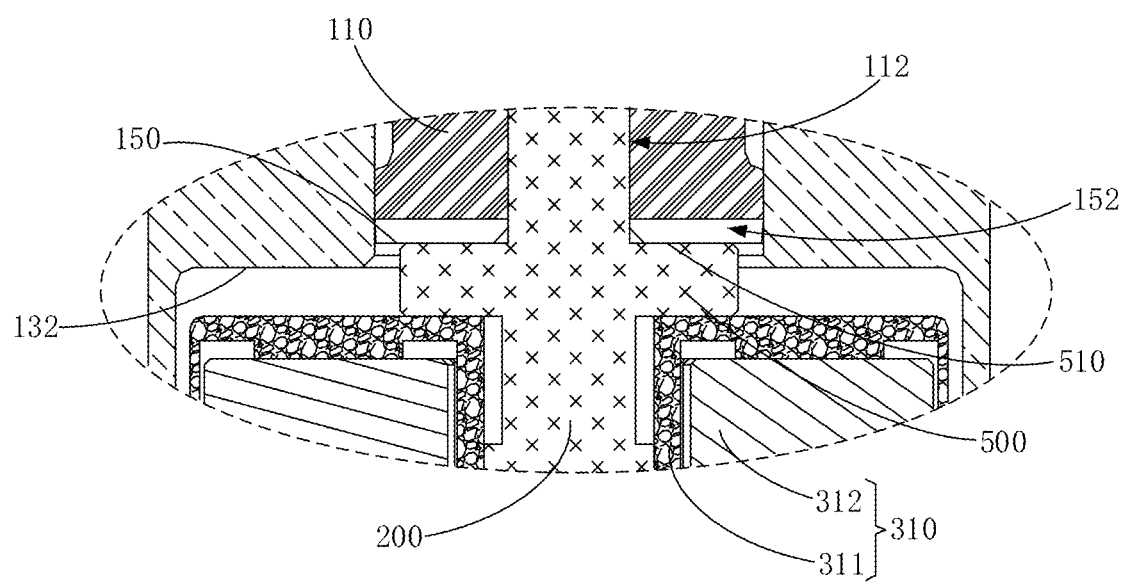
FIG. 4 is an enlarged view of a part A in FIG. 3.

Referring to FIG. 3 and FIG. 4, the driving device 20 includes a housing assembly 100, a rotating shaft 200, a rotor 300, and a stator 400. The rotating shaft 200 is rotatably mounted on the housing assembly 100 and fixedly connected to the impeller 40. The rotor 300 is fixedly connected to the rotating shaft 200, so that the rotor 300 can drive the rotating shaft 200 to rotate. The stator 400 is capable of driving the rotor 300 to rotate.

The housing assembly 100 is generally cylindrical as a whole. A distal end of the housing assembly 100 is fixedly connected to the cannula assembly 30, and a proximal end of the is housing assembly 100 is fixedly connected to the catheter 50. Specifically, the housing assembly 100 includes a first shaft sleeve 110, a second shaft sleeve 120, and a housing 130, and both the first shaft sleeve 110 and the second shaft sleeve 120 are fixedly connected to the housing 130. In some embodiments, the housing 130, the first shaft sleeve 110, and the second shaft sleeve 120 are independent elements prior to assembly, and when assembled, both the first shaft sleeve 110 and the second shaft sleeve 120 may be fixed in the housing 130 by adhesive bonding. The first shaft sleeve 110 is located at an end of the housing 130 adjacent to the impeller 40, and the second shaft sleeve 120 is located at an end of the housing 130 away from the impeller 40. That is, the first shaft sleeve 110 and the second shaft sleeve 120 are located at the distal end and the proximal end of the housing assembly 100, respectively, such that the first shaft sleeve 110 and the second shaft sleeve 120 are spaced apart by a preset distance in an axial direction of the housing assembly 100.

Specifically, the housing 130 is substantially cylindrical. A distal end of the housing 130 is fixedly connected to the cannula assembly 30, and a proximal end of the housing 130 is fixedly connected to the catheter 50. The housing 130 is provided with a receiving cavity 131. Specifically, the housing 130 has a first cavity wall 132 and a second cavity wall 133 defining a boundary of the receiving cavity 131, and the first cavity wall 132 and the second cavity wall 133 are opposite and parallel to each other. The housing 130 also is provided with a first mounting hole 134 and a second mounting hole 135, and both of which are in communication with the receiving cavity 131. An opening of the first mounting hole 134 is located on the first cavity wall 132, and an opening of the second mounting hole 135 is located on the second cavity wall 133. The first shaft sleeve 110 is mounted in the first mounting hole 134, and the second shaft sleeve 120 is mounted in the second mounting hole 135.

In the illustrated embodiment, the housing assembly 100 further includes a fixing member 140 fixedly connected to the housing 130. The second shaft sleeve 120 is partially received in the fixing member 140, and is partially received in the second mounting hole 135. The fixing member 140 is provided with a fluid channel 142 in communication with a second shaft hole 122, and the fluid channel 142 is configured to be in communication with the flushing line.

One part of the rotating shaft 200 is received in the housing assembly 100, and another part of the rotating shaft 200 extends outside the housing assembly 100 and is fixedly connected to the impeller 40. The portion of the rotating shaft 200 extending outside the housing assembly 100 and fixedly connected to the impeller 40 is defined as a connecting section 210. In the illustrated embodiment, the rotating shaft 200 is rotatably mounted on the first shaft sleeve 110 and the second shaft sleeve 120, and the first shaft sleeve 110 and the second shaft sleeve 120 can limit the rotating shaft 200 in the radial direction, so as to limit a radial swing range of the rotating shaft 200. The rotating shaft 200 rotatably extends through the first shaft sleeve 110, and an end of the rotating shaft 200 away from the connecting section 210 is rotatably mounted on the second shaft sleeve 120. Specifically, the first shaft sleeve 110 is provided with a first shaft hole 112, and the second shaft sleeve 120 is provided with a second shaft hole 122. The rotating shaft 200 rotatably extends through the first shaft hole 112, and the end of the rotating shaft 200 away from the connecting section 210 is rotatably provided in the second shaft hole 122.

Both the rotor 300 and the stator 400 are accommodated in the receiving cavity 131, so that the rotor 300 and the stator 400 are located between the first cavity wall 132 and the second cavity wall 133. Both the rotor 300 and the stator 400 are located between the first shaft sleeve 110 and the second shaft sleeve 120, and the rotating shaft 200 rotatably extends through the stator 400. Specifically, the rotor 300 is magnetic, and the stator 400 is can generates a rotating magnetic field to drive the rotor 300 to rotate.

In the illustrated embodiment, the rotor 300 includes a first rotor unit 310 and a second rotor unit 320, both of which are fixedly connected to the rotating shaft 200. Both the first rotor unit 310 and the second rotor unit 320 are accommodated in the receiving cavity 131. The stator 400 is located between the first rotor unit 310 and the second rotor unit 320. The first rotor unit 310 is arranged adjacent to the first shaft sleeve 110, and the second rotor unit 320 is arranged adjacent to the second shaft sleeve 120. The first rotor unit 310 and the second rotor unit 320 are both magnetic, and the stator 400 can generate the rotating magnetic field to drive the first rotor unit 310 and the second rotor unit 320 to rotate. When the first rotor unit 310 and the second rotor unit 320 rotate, the rotating shaft 200 will rotate along with the first rotor unit 310 and the second rotor unit 320, and finally the impeller 40 will rotate along with the rotating shaft 200.

Figure 5:
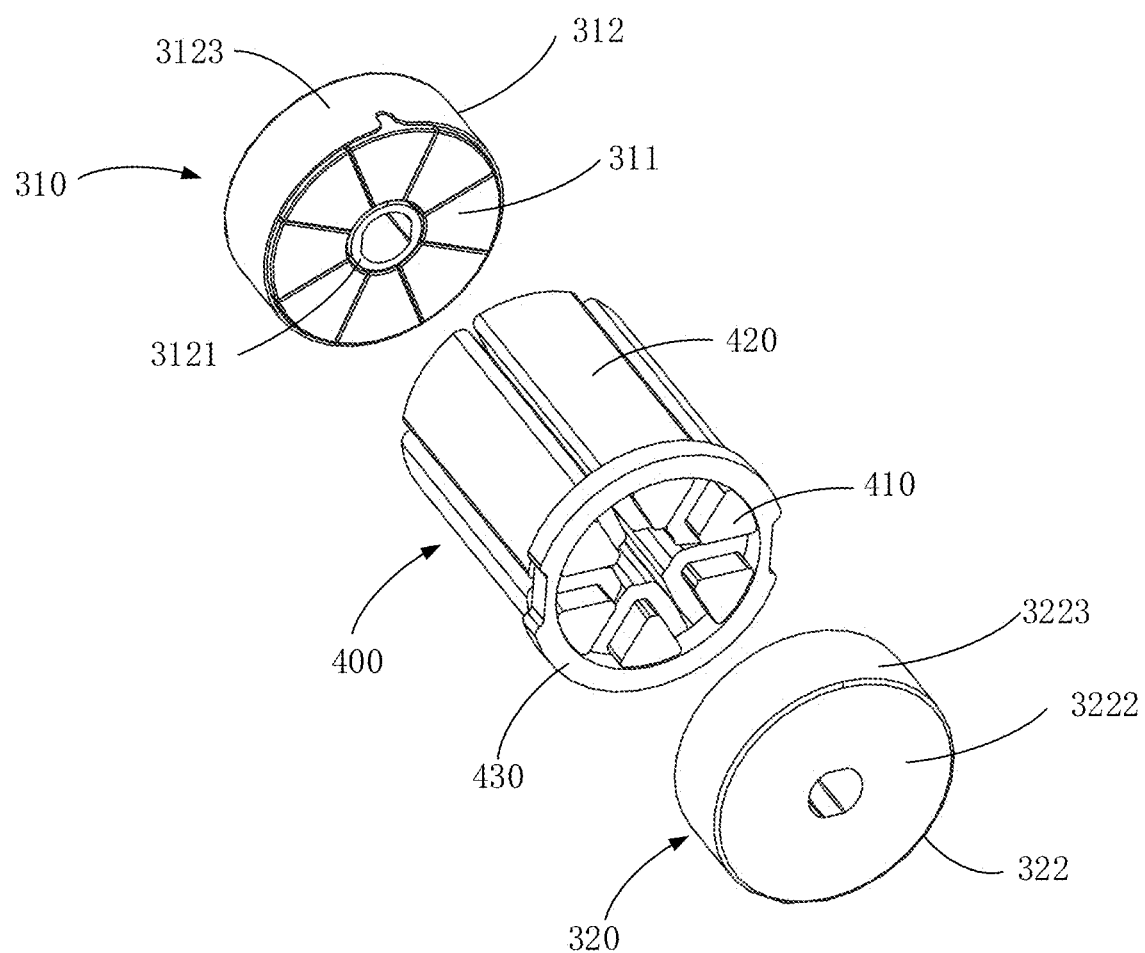
FIG. 5 is a perspective view of a rotor and a stator of the blood pump shown in FIG. 1.
Figure 6:
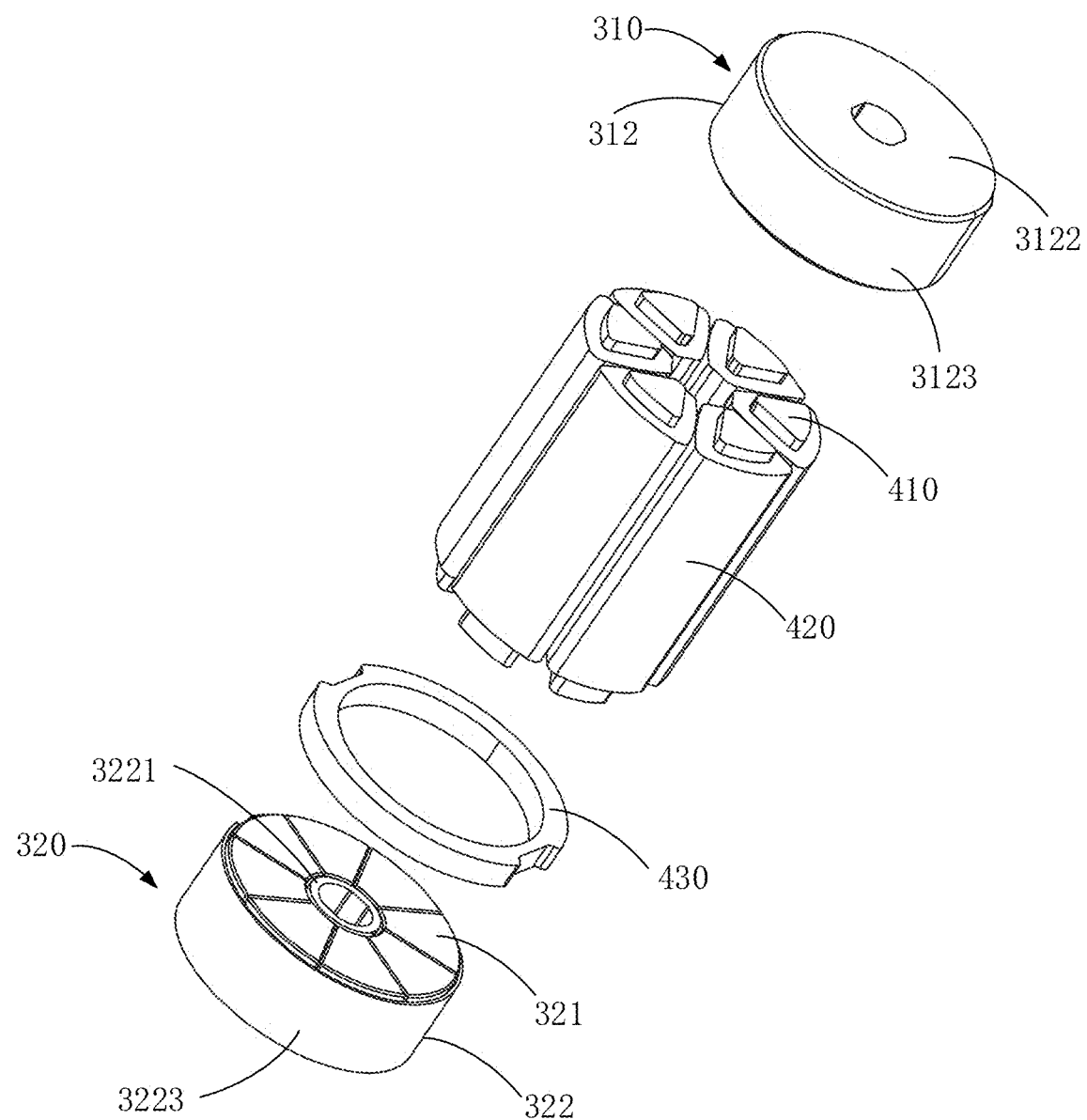
FIG. 6 is a perspective view of the rotor and the stator of the blood pump shown in FIG. 5 viewed from another aspect.

Referring to FIGS. 5 and 6, in the illustrated embodiment, the first rotor unit 310 includes a first magnetic member 311, and the first magnetic member 311 is fixedly connected to the rotating shaft 200. The first magnetic member 311 is an annular Halbach array magnet.

The first rotor unit 310 further includes a first flywheel 312 fixedly connected to the rotating shaft 200, and the first magnetic member 311 is fixedly connected to the first flywheel 312. By providing the first flywheel 312, the connection strength between the first magnetic member 311 and the rotating shaft 200 can be enhanced, and the shaking of the rotating shaft 200 during rotation can also be reduced, so that the whole rotating shaft 200 is more stable during rotation.

Specifically, the first flywheel 312 includes a first built-in tube 3121, a first disc-shaped portion 3122, and a first outer ring wall 3123. Both the first built-in tube 3121 and the first outer ring wall 3123 are circular tubular structures, and the first disc-shaped portion 3122 is an annular disk structure. Both the first built-in tube 3121 and the first outer ring wall 3123 are fixedly connected to the first disc-shaped portion 3122. The first outer ring wall 3123 is arranged surrounding the first disc-shaped portion 3122. The first built-in tube 3121 and the first outer ring wall 3123 are arranged coaxially, and the rotating shaft 200 extends through the first built-in tube 3121 and is fixedly connected to the first built-in tube 3121. A first mounting cavity is formed between the first built-in tube 3121 and the first outer ring wall 3123. The first magnetic member 311 is accommodated in the first mounting cavity. The shape of the first mounting cavity is adapted to the first magnetic member 311 to facilitate the mounting and positioning of the first magnetic member 311. This arrangement enables the first flywheel 312 to limit the first magnetic member 311, which not only facilitates the mounting of the first magnetic member 311, but also enables the combination of the first magnetic member 311 and the first flywheel 312 to be more stable.

The structure of the second rotor unit 320 is substantially the same as that of the first rotor unit 310. The second rotor unit 320 includes a second magnetic member 321 fixedly connected to the rotating shaft 200. Specifically, the second magnetic member 321 is an annular Halbach array magnet.

The second rotor unit 320 further includes a second flywheel 322 fixedly connected to the rotating shaft 200, and the second magnetic member 321 is fixed to the second flywheel 322. By providing the second flywheel 322, the connection strength between the second magnetic member 321 and the rotating shaft 200 can be enhanced, and the shaking of the rotating shaft 200 during rotation can also be reduced, so that the whole rotating shaft 200 is more stable during rotation.

The second flywheel 322 includes a second built-in tube 3221, a second disc-shaped portion 3222, and a second outer ring wall 3223. Both the second built-in tube 3221 and the second outer ring wall 3223 have circular tubular structures, and the second disc-shaped portion 3222 has an annular disk structure. Both the second built-in tube 3221 and the second outer ring wall 3223 are fixedly connected to the second disc-shaped portion 3222. The second outer ring wall 3223 is arranged around the second disc-shaped portion 3222. The second built-in tube 3221 and the second outer ring wall 3223 are arranged coaxially, and the rotating shaft 200 extends through the second built-in tube 3221 and is fixedly connected to the second built-in tube 3221. A second mounting cavity is formed between the second built-in tube 3221 and the second outer ring wall 3223. The second magnetic member 321 is accommodated in the second mounting cavity. A shape of the second mounting cavity is adapted to the second magnetic member 321 to facilitate the mounting and positioning of the second magnetic member 321. Such arrangement enables the second flywheel 322 to limit the second magnetic member 321, which not only facilitates the installation of the second magnetic member 321, but also enables the combination of the second magnetic member 321 and the second flywheel 322 to be more stable.

It should be noted that the first flywheel 312 is not limited to the above structure. In some embodiments, the first flywheel 312 does not have the first outer ring wall 3123. In some embodiments, the first flywheel 312 does not have the first outer annular wall 3123 and the first built-in tube 3121. In this case, the rotating shaft 200 fixedly extends through a center of the first disc-shaped portion 3122. Compared with the first flywheel 312 having only the first disc-shaped portion 3122, the first built-in tube 3121 is provided, so that the first flywheel 312 can be more stably connected to the rotating shaft 200. The second flywheel 322 is not limited to the above structure. In some embodiments, the second flywheel 322 does not have the second outer ring wall 3223. In some embodiments, the second flywheel 322 does not have the second outer ring wall 3223 and the second built-in tube 3221. In this case, the rotating shaft 200 fixedly extends through a center of the second disc-shaped portion 3222. Compared with the second flywheel 322 having only the second disc-shaped portion 3222, the second built-in tube 3221 is provided, so that the second flywheel 322 can be more stably connected to the rotating shaft 200.

In some embodiments, the stator 400 includes a plurality of magnetic cores 410 and a plurality of coils 420. The plurality of magnetic cores 410 are spaced apart along a circle, and the plurality of coils 420 are wound around the plurality of magnetic cores 410, respectively. Specifically, an extending direction of each magnetic core 410 is consistent with an extending direction of the rotating shaft 200.

In the illustrated embodiment, the magnetic core 410 is substantially columnar, and a size of the cross-section of the magnetic core 410 remains constant in the extending direction of the magnetic core 410. The first rotor unit 310 and the second rotor unit 320 are adjacent to both ends of the magnetic core 410, respectively. More specifically, the first magnetic member 311 of the first rotor unit 310 is adjacent to one end of the magnetic core 410, and the second magnetic member 321 of the second rotor unit 320 is adjacent to the other end of the magnetic core 410, so that the magnetic core 410 can be magnetically coupled with the first magnetic member 311 and the second magnetic member 321, simultaneously, and the stator 400 can simultaneously drive the first rotor unit 310 and the second rotor unit 320 to rotate.

The shape of the cross-section of the magnetic core 410 is substantially triangular prism-shaped, and an edge of each magnetic core 410 faces an axis of the rotating shaft 200. For example, the edges of the magnetic core 410 are chamfered, that is, the edges of the magnetic core 410 are relatively smooth and blunt rounded edges, so as to eliminate the sharp edges on the magnetic core 410, which not only facilitates the subsequent winding of the coil 420, but also facilitates the protection of the insulating material coated on the coil 420. In another example, the cross-sectional shape of the magnetic core 410 can also be a sector, a circle, a trapezoid, a sector ring, etc.

It should be understood that the structure of the magnetic core 410 is not limited to the above structure. In other embodiments, each magnetic core 410 includes a magnetic column and a head portion (i.e., a pole shoe) provided on the magnetic column. Two head portions are provided, both ends of the magnetic column are provided with the head portions. An extending direction of the magnetic column is consistent with the extending direction of the rotating shaft 200, and the coil 420 is wound on the magnetic column of each magnetic core 410. In the extending direction of the magnetic column, a size of the cross-section of the magnetic column remains constant. In general, a thickness of the magnetic column is uniform. At this time, the first rotor unit 310 and the second rotor unit 320 are adjacent to the two head portions, respectively.

While the columnar magnetic core 410 shown in FIG. 2 to FIG. 6 has no head portion (i.e. pole shoe) with large width. In this case, the entire magnetic core 410 can be magnetically coupled with the rotor 300. Compared with the magnetic core 410 having the head portion, on the one hand, the magnetic core 410 having only the columnar shape can reduce the magnetic loss, and increase the magnetic coupling density between the magnetic core 410 and the rotor 300 to increase the torque of the stator 400 to the rotor 300 under the same current. On the other hand, the magnetic core 410 without the head portion can also greatly reduce the power reduction problem of the driving device 20 due to the local magnetic short circuit caused by the contact between the adjacent magnetic cores 410.

Specifically, the magnetic core 410 is made of a magnetic material, such as silicon steel. Therefore, the magnetic core 410 is attractive to the first magnetic member 311 and the second magnetic member 321 at the same time, that is, an attractive force is formed between the stator 400 and the first rotor unit 310, and an attractive force is formed between the stator 400 and the second rotor unit 320.

Specifically, the stator 400 further includes a positioning ring 430 fixedly sleeved on the plurality of magnetic cores 410. The positioning ring 430 is made of a material that is neither electrically conductive nor magnetically conductive. The positioning ring 430 is made of polyetheretherketone or ceramic. Both the polyetheretherketone and the ceramic are non-conductive and non-magnetic materials, so that the performance of the stator 400 is not affected, and the polyetheretherketone has the advantages of hydrolysis resistance, dimensional stability, electrical performance, insulating performance, etc. The ceramic has high biocompatibility, high mechanical strength, good wear resistance and corrosion resistance. In the illustrated embodiment, the positioning ring 430 has a substantially annular structure, and the plurality of magnetic cores 410 are bonded and fixed to an inner ring of the positioning ring 430, respectively. The positioning ring 430 is fixedly connected to the housing 130. The positioning ring 430 is configured to support and position the magnetic core 410, and at the same time, fix the stator 400 in the housing assembly 100.

In order to achieve axial limiting of the rotating shaft 200, the housing assembly 100 includes a limiting surface 150. The driving device 20 further includes a thrust member 500 fixedly connected to at least one of the rotating shaft 200 and the rotor 300. The thrust member 500, the limiting surface 150, and the rotor 300 are arranged along the axial direction of the rotating shaft 200. The thrust member 500 is located between the limiting surface 150 and the rotor 300. The thrust member 500 can abut against the limiting surface 150. The stator 400 can generate a magnetic thrust force against the rotor 300, and the magnetic thrust force enables the thrust member 500 to abut against the limiting surface 150, thereby limiting a range of movement of the rotating shaft 200 in the axial direction of the rotating shaft 200. Specifically, the limiting surface 150 is located on the first shaft sleeve 110, and the thrust member 500 is located between the first shaft sleeve 110 and the rotor 300. An opening of the first shaft hole 112 is located on the limiting surface 150, and a center axis of the first shaft hole 112 is perpendicular to the limiting surface 150. In the illustrated embodiment, the first shaft sleeve 110, the thrust member 500, the first rotor unit 310, the stator 400, the second rotor unit 320, and the second shaft sleeve 120 are sequentially arranged along the axis of the rotating shaft 200.

In order to realize that the thrust member 500 is fixedly connected to at least one of the rotating shaft 200 and the rotor 300, the thrust member 500 may be directly fixed only to the rotor 300, or may be directly fixed only to the rotating shaft 200, or may be directly fixed to both the rotor 300 and the rotating shaft 200. Since the rotor 300 is fixedly connected to the rotating shaft 200, as long as the thrust member 500 is fixedly connected to one of the rotating shaft 200 and the rotor 300, the three can rotate and move synchronously. In the illustrated embodiment, the thrust member 500 is fixedly connected to the rotating shaft 200, and a side of the thrust member 500 opposite to the limiting surface 150 is fixedly connected to the first flywheel 312 (specifically, the first disc-shaped portion 3122) of the first rotor unit 310. In some embodiments, the thrust member 500 and the rotating shaft 200 are integrally formed. In some embodiments, the thrust member 500 and the rotating shaft 200 are fixed by adhesion or welding, i.e., the thrust member 500 and the rotating shaft 200 are separate components prior to assembly. Since the volume of the blood pump 1 is small, the thrust member 500 and the rotating shaft 200 are integrally formed to facilitate the assembly of the driving device 20.

Figure 7:
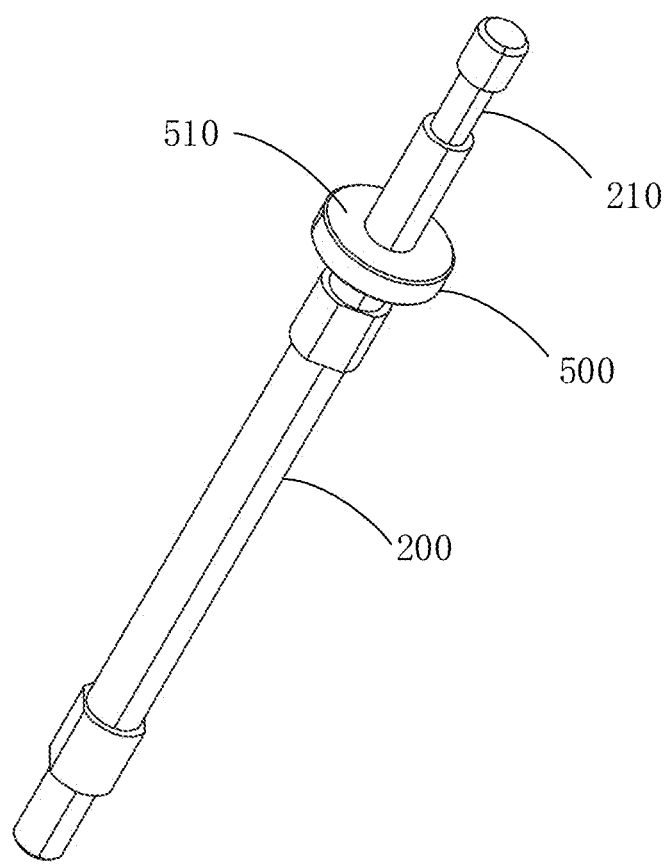
FIG. 7 is an assembly view of the rotor and a thrust member of the blood pump shown in FIG. 1.

Referring to FIGS. 3, 4 and 7, specifically, the thrust member 500 has a thrust surface 510 opposite to the limiting surface 150, and the thrust surface 510 abuts against the limiting surface 150. That is, the thrust member 500 abuts against the limiting surface 150 through the thrust surface 510. In the illustrated embodiment, both the thrust surface 510 and the limiting surface 150 are annular. The axis of the rotating shaft 200 is perpendicular to the thrust surface 510, and the axis of the rotating shaft 200 extends through a center of the thrust surface 510. The center axis of the first shaft hole 112 extends through a center of the limiting surface 150. A ratio of an outer diameter of the thrust surface 510 to an outer diameter of the limiting surface 150 is 0.75 to 1, so that the thrust member 500 and the limiting surface 150 can have a suitable contact area. If the outer diameter of the thrust surface 510 is too small, the contact area between the thrust member 500 and the limiting surface 150 is too small, which increases the wear of the limiting surface 150. Moreover, since the contact area between the thrust member 500 and the limiting surface 150 is small, it is easy to cause the rotating shaft 200 to deflect radially during rotation. If the outer diameter of the thrust surface 510 exceeds the outer diameter of the limiting surface 150, the effective contact area between the thrust member 500 and the limiting surface 150 is equal to the area of the limiting surface 150, which increases the radial dimension of the thrust member 500.

In the illustrated embodiment, the thrust member 500 is substantially an annular structure, and the thrust member 500 is coaxial with the rotating shaft 200. The thrust member 500 may be a continuous and closed annular structure. The thrust member 500 may also be formed by arranging a plurality of sector rings evenly spaced in a circle around the rotating shaft 200, or may be understood as being formed by arranging a plurality of sector rings that are arranged discretely in a circumferential direction. The thrust surface 510 is a surface of the thrust member 500, and a surface of the thrust member 500 away from the thrust surface 510 is fixedly connected to the first flywheel 312 (specifically, the first disc-shaped portion 3122) of the first rotor unit 310.

Specifically, a roughness of at least one of the thrust surface 510 and the limiting surface 150 is less than or equal to 0.1 micron. In some embodiments, the roughness of both the thrust surface 510 and the limiting surface 150 is less than or equal to 0.1 micron. In some embodiments, the roughness of one of the thrust surface 510 and the limiting surface 150 is less than or equal to 0.1 micron. By reducing the roughness of at least one of the thrust surface 510 and the limiting surface 150, the friction force between the thrust surface 510 and the limiting surface 150 can be effectively reduced, and the wear problem caused by the friction between the limiting surface 150 and the thrust member 500 can be reduced.

In some embodiments, at least one of the thrust surface 510 and the limiting surface 150 is made of ceramic. The ceramic has high processing precision, high biocompatibility, high mechanical strength, good wear resistance and corrosion resistance. In this case, the thrust member 500 and the first shaft sleeve 110 can be made of ceramic, or at least one of the thrust surface 510 and the limiting surface 150 may be a ceramic surface by providing a ceramic coating. In some embodiments, the thrust surface 510 is made of diamond, so that the thrust surface 510 has a relatively high hardness, a relatively smooth surface, and wear resistance. In this case, the thrust surface 510 is a ceramic surface by providing a diamond coating.

Specifically, a portion of the limiting surface 150 is recessed to form a flow guide groove 152, and the flow guide groove 152 is in communication with the first shaft hole 112 of the first shaft sleeve 110. When the thrust member 500 abuts against the limiting surface 150, a part of the flow guide groove 152 is not covered by the thrust member 500, so that when the thrust member 500 abuts against the limiting surface 150, the problem that the thrust member 500 blocks a gap between the first shaft hole 112 and the rotating shaft 200 to cause obstruction to the circulation of the flushing liquid is solved. The part of the flow guide groove 152 not covered by the thrust member 500 can achieve fluid communication when the thrust member 500 abuts against the limiting surface 150, so as to ensure the smooth flow of the flushing liquid. In addition, the portion of the limiting surface 150 is recessed to form the flow guide groove 152, so that the flushing liquid can flow into the space between the thrust member 500 and the limiting surface 150 better, so as to lubricate the contact surface between the thrust member 500 and the limiting surface 150, reduce the friction between the thrust member 500 and the limiting surface 150, and reduce the wear caused by the friction between the thrust member 500 and the limiting surface 150.

Specifically, when the thrust member 500 abuts against the limiting surface 150, the first cavity wall 132 is spaced from the rotor 300 (specifically, the first flywheel 312 of the first rotor unit 310) by a certain distance, so as to avoid friction caused by contact between the first cavity wall 132 and the rotor 300. Similarly, when the thrust member 500 abuts against the limiting surface 150, the second cavity wall 133 is also spaced from the second flywheel 322 of the second rotor unit 320 of the rotor 300 by a certain distance, so as to avoid friction caused by contact between the second cavity wall 133 and the second rotor unit 320.

In order to achieve that the magnetic thrust force generated by the stator 400 to the rotor 300 enables the thrust member 500 to abut against the limiting surface 150, the attractive force between the stator 400 and the first rotor unit 310 is defined as a first attractive force, and the attractive force between the stator 400 and the second rotor unit 320 is defined as a second attractive force. The second attractive force is greater than the first attractive force, so as to form the magnetic thrust force that enables the thrust member 500 to abut against the limiting surface 150.

In this embodiment, the first rotor unit 310 and the second rotor unit 320 have the same structure, that is, when a distance between the first rotor unit 310 and the stator 400 is equal to a distance between the second rotor unit 320 and the stator 400, the attractive force between the first rotor unit 310 and the stator 400 is equal to the attractive force between the second rotor unit 320 and the stator 400. The distance between the stator 400 and the first rotor unit 310 along the axial direction of the rotating shaft 200 is defined as a first distance H, and the distance between the stator 400 and the second rotor unit 420 along the rotating shaft 200 is defined as the second distance h. The first distance H is greater than the second distance h, so that the second attractive force is greater than the first attractive force. Specifically, the first distance is a distance between the magnetic core 410 of the stator 400 and the first magnetic member 311 of the first rotor unit 310, and the second distance is a distance between the magnetic core 410 of the stator 400 and the second magnetic member 321 of the second rotor unit 320.

In some embodiments, a ratio of the first distance H to the second distance h may be 1.2 to 2. By controlling the ratio of the first distance H to the second distance h within this range, the difference between the second attractive force and the first attractive force is controlled within a reasonable range, that is, a value of the magnetic thrust force is controlled. If the magnetic thrust force is too large, an axial pressure of the thrust member 500 to the limiting surface 150 is too large, resulting in a large friction force between the thrust member 500 and the limiting surface 150, so that the thrust member 500 and the limiting surface 150 are increased, which will lead to an obstruction for the rotation of the rotating shaft 200, and even the rotating shaft 200 cannot be started. If the magnetic thrust force is too small, the axial thrust force received by the thrust member 500 is small. During the rotation of the rotating shaft 200, the thrust member 500 cannot stably abut against the limiting surface 150, which may cause the larger axial vibration of the rotating shaft 200. In some embodiments, the first distance H ranges from 0.3 mm to 0.4 mm, for example, the first distance H may be 0.3 mm, 0.35 mm, 0.4 mm, etc. The second distance ranges from 0.2 mm to 0.25 mm, and the first distance may also be 0.2 mm, 0.21 mm or 0.25 mm, etc.

The blood pump 1 and the driving device 20 described above have at least the following advantages:

The thrust member 500 fixedly connected to at least one of the rotor 300 and the rotating shaft 200 is provided between the limiting surface 150 of the housing assembly 100 and the rotor 300, so that the thrust member 500 abuts against the limiting surface 150, so as to avoid or replace the abutting friction between the rotor 300 and the limiting surface 150, thereby avoiding serious wear caused by the direct contact between a core component of the conventional blood pump, i.e., a rotor, and the housing assembly 100, and prolonging the service life of the driving device 20 and the blood pump 1. The stator 400 configured to drive the rotor 300 to rotate generates the magnetic thrust force against the rotor 300, so that the thrust member 500 abuts against the limiting surface 150, so as to achieve the axial limiting of the rotating shaft 200, thereby reducing the axial vibration of the rotating shaft 200 and improving the stability and reliability of the driving device 20.

A structure of a driving device of a blood pump according to a second embodiment is substantially the same as that of the driving device 20 according to the first embodiment, and a difference lies in that the structure of the stator is different.

Figure 8:
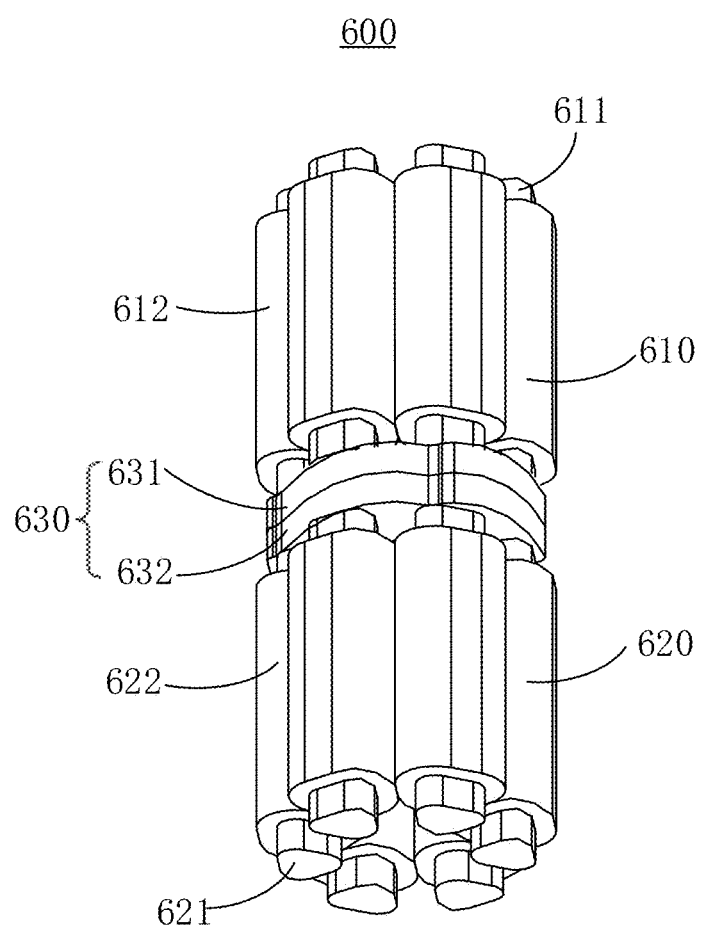
FIG. 8 is a perspective view of a stator of a driving device of a blood pump according to a second embodiment.

As shown in FIG. 8, in this embodiment, the stator 600 includes a first stator unit 610, a second stator unit 620, and a magnetic conduction member 630. The first stator unit 610, the magnetic conduction member 630, and the second stator unit 620 are arranged sequentially along the axis of the rotating shaft. The rotating shaft rotatably extends through the first stator unit 610, the magnetic conduction member 630, and the second stator unit 620.

The first stator unit 610, the second stator unit 620, and the magnetic conduction member 630 are located between the first rotor unit 310 and the second rotor unit 320 as shown in FIGS. 2 to 6. The first stator unit 610 is adjacent to the first rotor unit 310, and the second stator unit 620 is adjacent to the second rotor unit 320. The first stator unit 610 can drive the first rotor unit 310 to rotate, and the second stator unit 620 can drive the second rotor unit 320 to rotate. The first attractive force is formed between the first stator unit 610 and the first rotor unit 310, and the second attractive force is formed between the second stator unit 620 and the second rotor unit 320.

The structures of the first stator unit 610 and the second stator unit 620 are substantially the same as the structure of the stator 400 shown in FIG. 5 and FIG. 6. The first stator unit 610 includes a first magnetic core 611 and a first coil 612, and the first coil 612 is wound on the first magnetic core 611. The second stator unit 620 includes a second magnetic core 621 and a second coil 622 wound on the second magnetic core 621. The first magnetic core 611 and the second magnetic core 621 may be provided with head portions, respectively, or may not be provided with head portions. The difference lies in that the first stator unit 610 and the second stator unit 620 are not provided with the positioning ring 430 of the stator 400 shown in FIG. 5 and FIG. 6.

The first magnetic core 611 of the first stator unit 610 and the second magnetic core 621 of the second stator unit 620 are both fixedly connected to the magnetic conduction member 630. If the first magnetic core 611 has a head portion, an end of the first magnetic core 611 away from the head portion is fixedly connected to the magnetic conduction member 630, and the first rotor unit 310 is adjacent to the head portion of the first magnetic core 611. If the second magnetic core 621 has a head portion, the end of the second magnetic core 621 away from the head portion is fixedly connected to the magnetic conduction member 630, and the second rotor unit 320 is adjacent to the head portion of the second magnetic core 621. If the first magnetic core 611 has no head portion, one end of the first magnetic core 611 is fixedly connected to the magnetic conduction member 630, and the first rotor unit 310 is adjacent to the other end of the first magnetic core 611. If the second magnetic core 621 has no head portion, one end of the second magnetic core 621 is fixedly connected to the magnetic conduction member 630, and the second rotor unit 320 is adjacent to the other end of the second magnetic core 621.

The magnetic conduction member 630 serves to close a magnetic circuit, so as to promote and increase generation of the magnetic flux and improve a coupling capability. Therefore, both the first magnetic core 611 of the first stator unit 610 and the second magnetic core 621 of the second stator unit 620 are fixedly connected to the magnetic conduction member 630, which can close the magnetic circuit between the first stator unit 610 and the first rotor unit 310, and close the magnetic circuit between the second stator unit 620 and the second rotor unit 320, so as to increase the magnetic flux. Therefore, the arrangement of the magnetic conduction member 630 helps to reduce an overall diameter of the driving device 20. In addition, both the first magnetic core 611 of the first stator unit 610 and the second magnetic core 621 of the second stator unit 620 are fixedly connected to the magnetic conduction member 630, so that the first stator unit 610 and the second stator unit 620 can be positioned and mounted, and the assembly difficulty of the first stator unit 610 and the second stator unit 620 is reduced. In order to facilitate fixation of the stator 600 in the housing assembly, a slot cooperating with the magnetic conduction member 630 may be provided in the housing of the housing assembly, and the slot is engaged with the magnetic conduction member 630 to achieve overall fixation of the stator 600. Therefore, the magnetic conduction member 630 provided in the above manner can also reduce arrangement of a positioning structure in the housing assembly, thereby simplifying the structure of the housing assembly and simplifying the assembly process of the entire driving device.

Specifically, the magnetic conduction member 630 includes a first magnetic conduction plate portion 631 and a second magnetic conduction plate portion 632. The first magnetic conduction plate portion 631 is fixedly connected to the first magnetic core 611 of the first stator unit 610, and the second magnetic conduction plate portion 632 is fixedly connected to the second magnetic core 621 of the second stator unit 620. The first magnetic conduction plate portion 631 and the second magnetic conduction plate portion 632 are stacked. That is, sides of the first magnetic conduction plate portion 631 and the second magnetic conduction plate portion 632 adjacent to each other abut against each other. The rotating shaft rotatably extends through the first magnetic conduction plate portion 631 and the second magnetic conduction plate portion 632.

Specifically, the first magnetic conduction plate portion 631 is fixedly connected to the second magnetic conduction plate portion 632, so that the first stator unit 610, the second stator unit 620, and the magnetic conduction member 630 are formed as a whole and assembled into the housing, so that the assembly of the stator 600 is easier.

Specifically, the first magnetic conduction plate portion 631 and the second magnetic conduction plate portion 632 are fixed by welding or adhesion. In other words, the first magnetic conduction plate portion 631 and the second magnetic conduction plate portion 632 are two separated components prior to assembly. By arranging the magnetic conduction member 630 into the first magnetic conduction plate portion 631 and the second magnetic conduction plate portion 632 that are separated prior to assembly, when assembling the driving device, the first magnetic core 611 can be fixedly connected to the first magnetic conduction plate portion 631, the second magnetic core 621 can be fixedly connected to the second magnetic conduction plate portion 632, and then the first magnetic conduction plate portion 631 and the second magnetic conduction plate portion 632 are stacked and fixed. In this way, the first magnetic core 611 and the second magnetic core 621 can be easily assembled to the first magnetic conduction plate portion 631 and the second magnetic conduction plate portion 632, respectively, and the first magnetic core 611 and the second magnetic core 621 can be assembled more easily.

It should be noted that the first magnetic conduction plate portion 631 and the second magnetic conduction plate portion 632 are made of silicon steel, and the first magnetic core 611 and the second magnetic core 621 are made of silicon steel. The magnetic conduction member 630 is not limited to the above manner in which it is formed by combining the first magnetic conduction plate portion 631 and the second magnetic conduction plate portion 632 that are separated prior to assembly. In some embodiments, the first magnetic conduction plate portion 631 and the second magnetic conduction plate portion 632 are not fixedly connected together, but stacked together. In some embodiments, the magnetic conduction member 630 may also be an integrally formed plate-like structure. Both the first magnetic core 611 and the second magnetic core 621 are connected to the magnetic conduction member 630, that is, the first stator unit 610 and the second stator unit 620 share one magnetic conduction member 630.

Since the structure of the driving device of the second embodiment is substantially the same as that of the driving device 20 of the first embodiment, the driving device of the second embodiment also has a similar advantage to that of the driving device 20 of the first embodiment, which is not described herein again.

It should be understood that the driving device 20 is not limited to the above structure. In some embodiments, the second shaft sleeve 120 may be omitted. In this case, the driving device 20 has only the first shaft sleeve 110. In some embodiments, both the first shaft sleeve 110 and the second shaft sleeve 120 may be omitted, and a shaft hole allowing the rotating shaft 200 to extend through may be directly provided on the housing 130. In this case, the limiting surface 150 is a portion of the first cavity wall 132. In some embodiments, the rotor may have only one rotor unit, in this case, the stator is located between the rotor and the thrust member along the axial direction of the rotating shaft 200, so that the rotor is attracted by the stator toward the impeller 40. At this time, the structure of the stator may be the same as that of the stator 400 in FIG. 2 to FIG. 6, or may be different from that of the stator 400 in FIG. 2 to FIG. 6. At this time, the stator does not have the positioning ring 430 of the stator 400 in FIG. 3 to FIG. 6, but has a magnetic conduction back plate, which is fixedly connected to the end of the magnetic core away from the rotor. The magnetic conduction back plate is configured to close the magnetic circuit, so as to promote and increase the generation of magnetic flux, improve the coupling capability, increase the magnetic flux, which helps to reduce the overall diameter of the driving device.

Since the driving device of this embodiment has a structure similar to that of the driving device of the first embodiment, the driving device of this embodiment and the blood pump having the driving device of this embodiment also have advantages similar to those of the first embodiment.

The foregoing embodiments are merely intended to describe the technical solutions of the present disclosure, but not to limit the present disclosure. Although the present disclosure is described in detail with reference to the foregoing embodiments, those of ordinary skill in the art should understand that they may still make modifications to the technical solutions described in the foregoing embodiments or make equivalent replacements to some technical features thereof, without departing from the spirit and scope of the technical solutions of the embodiments of the present disclosure, all of which fall within the protection scope of the present disclosure.

What is claimed is:

1. A driving device configured to drive an impeller to rotate, the driving device comprising:
   a housing assembly comprising a limiting surface;
   a rotating shaft rotatably mounted to the housing assembly and fixedly connected to the impeller;
   a rotor fixedly connected to the rotating shaft;
   a thrust member fixedly connected to at least one of the rotating shaft and the rotor, wherein the thrust member, the limiting surface, and the rotor are arranged along an axial direction of the rotating shaft, the thrust member is located between the limiting surface and the rotor, and the thrust member is configured to abut against the limiting surface; and
   a stator configured to drive the rotor to rotate, wherein the stator is capable of generating a magnetic thrust force against the rotor, and the magnetic thrust force enables the thrust member to abut against the limiting surface.

2. The driving device according to claim 1, wherein the thrust member has a thrust surface opposite to the limiting surface, and the thrust surface abuts against the limiting surface;
   wherein a roughness of at least one of the thrust surface and the limiting surface is less than or equal to 0.1 micron;
   and/or the thrust surface and the limiting surface are made of ceramic;
   and/or, both the thrust surface and the limiting surface are annular, an axis of the rotating shaft is perpendicular to the thrust surface, the axis of the rotating shaft extends through a center of the thrust surface, the housing assembly is further provided with a shaft hole, the rotating shaft rotatably extends through the shaft hole, a center axis of the shaft hole extends through a center of the limiting surface and is perpendicular to the limiting surface, and a ratio of an outer diameter of the thrust surface to an outer diameter of the limiting surface is 0.75 to 1.

3. The driving device according to claim 1, wherein the thrust member is a continuous and closed annular structure; or the thrust member is formed by arranging a plurality of sector rings evenly spaced in a circle around the rotating shaft.

4. The driving device according to claim 1, wherein the housing assembly is further provided with a shaft hole, a portion of the limiting surface is recessed to form a flow guide groove in communication with the shaft hole, when the thrust member abuts against the limiting surface, the flow guide groove is at least partially not covered by the thrust member, and the rotating shaft rotatably extends through the shaft hole.

5. The driving device according to claim 1, wherein the housing assembly comprises a first shaft sleeve, a second shaft sleeve, and a housing, both the first shaft sleeve and the second shaft sleeve are fixedly connected to the housing, the first shaft sleeve is located at a distal end of the housing assembly, the second shaft sleeve is located at a proximal end of the housing assembly, the rotating shaft is rotatably mounted on the first shaft sleeve and the second shaft sleeve, the limiting surface is located on the first shaft sleeve, and the thrust member is located between the first shaft sleeve and the rotor.

6. The driving device according to claim 5, wherein the housing is provided with a receiving cavity, a first mounting hole, and a second mounting hole, both the first mounting hole and the second mounting hole are in communication with the receiving cavity, the housing assembly further comprises a fixing member fixedly connected to the proximal end of the housing, the first shaft sleeve is mounted in the first mounting hole, and the second shaft sleeve is partially accommodated in the fixing member, and partially accommodated in the second mounting hole.

7. The driving device according to claim 1, wherein the rotor comprises a first rotor unit and a second rotor unit that are fixedly connected to the rotating shaft, the thrust member, the first rotor unit, the stator, and the second rotor unit are sequentially arranged along the axial direction of the rotating shaft, the thrust member is located between the first rotor unit and the limiting surface, the stator is configured to drive the first rotor unit and the second rotor unit to rotate, a first attractive force is formed between the stator and the first rotor unit, a second attractive force is formed between the stator and the second rotor unit, and the second attractive force is greater than the first attractive force, so as to form the magnetic thrust force.

8. The driving device according to claim 7, wherein the housing assembly comprises a housing, the housing is provided with a receiving cavity and a first cavity wall and a second cavity wall that define a boundary of the receiving cavity, the first cavity wall and the second cavity wall are opposite and parallel to each other, the rotor and the stator are located between the first cavity wall and the second cavity wall, when the thrust member abuts against the limiting surface, the first cavity wall is spaced from the first rotor unit by a certain distance, and the second cavity wall is also spaced from the second rotor unit by a certain distance.

9. The driving device according to claim 7, wherein the first rotor unit comprises a first magnetic member and a first flywheel, the first flywheel is fixedly connected to the rotating shaft, the first flywheel comprises a first built-in tube, a first disc-shaped portion, and a first outer ring wall, the first outer ring wall surrounds the first disc-shaped portion, the first built-in tube and the first outer ring wall are coaxially arranged, the rotating shaft extends through the first built-in tube and is fixedly connected to the first built-in tube, the first magnetic member is fixedly connected to the first flywheel, the thrust member is provided with a thrust surface opposite to the limiting surface, and a surface of the thrust member away from the thrust surface is fixedly connected to the first disc-shaped portion of the first flywheel.

10. The driving device according to claim 7, wherein the stator comprises a first stator unit, a second stator unit, and a magnetic conduction member, the first stator unit, the magnetic conduction member, and the second stator unit are sequentially arranged along an axis of the rotating shaft, and are located between the first rotor unit and the second rotor unit, the first stator unit has a first magnetic core, the second stator unit has a second magnetic core, both the first magnetic core and the second magnetic core are fixedly connected to the magnetic conduction member, and the rotating shaft rotatably extends through the first stator unit, the magnetic conduction member and the second stator unit.

11. The driving device according to claim 10, wherein the magnetic conduction member comprises a first magnetic conduction plate portion and a second magnetic conduction plate portion that are stacked, the first magnetic conduction plate portion is fixedly connected to the first magnetic core, and the second magnetic conduction plate portion is fixedly connected to the second magnetic core.

12. The driving device according to claim 7, wherein when a distance between the first rotor unit and the stator is equal to a distance between the second rotor unit and the stator, the attractive force between the first rotor unit and the stator is equal to the attractive force between the second rotor unit and the stator, a first distance is formed between the stator and the first rotor unit along the axial direction of the rotating shaft, a second distance is formed between the stator and the second rotor unit along the axial direction of the rotating shaft, and the first distance is greater than the second distance to enable the second attractive force to be greater than the first attractive force.

13. The driving device according to claim 12, wherein the stator comprises a plurality of magnetic cores, an extending direction of each magnetic core is consistent with an extending direction of the rotating shaft, the first rotor unit comprises a first magnetic member, the second rotor unit comprises a second magnetic member;

wherein the first distance is a distance between the magnetic core of the stator and a first magnetic member of the first rotor unit;

the second distance is a distance between the magnetic core of the stator and a second magnetic member of the second rotor unit.

14. The driving device according to claim 12, wherein a ratio of the first distance to the second distance is 1.2 to 2; or the first distance ranges from 0.3 mm to 0.4 mm, and the second distance ranges from 0.2 mm to 0.25 mm.

15. The driving device according to claim 7, wherein the stator comprises a plurality of magnetic cores and a plurality of coils, the plurality of magnetic cores surround the rotating shaft, each magnetic core is wound with the coil, an end of each magnetic core is adjacent to the first rotor unit, another end of each magnetic core is adjacent to the second rotor unit, the stator is configured to generate a rotating magnetic field that drives the first rotor unit and the second rotor unit to rotate, both the first rotor unit and the second rotor unit are magnetic, the first attractive force is formed between the first rotor unit and the magnetic core, and the second attractive force is formed between the second rotor unit and the magnetic core.

16. The driving device according to claim 15, wherein the stator further comprises a positioning ring fixedly sleeved on the plurality of magnetic cores.

17. The driving device according to claim 16, wherein the positioning ring is made of a non-conductive material; and/or the positioning ring is made of a non-magnetic material.

18. The driving device according to claim 16, wherein the housing assembly comprises a housing, the positioning ring is fixedly connected to the housing, and the plurality of magnetic cores are adhered and fixed to an inner ring of the positioning ring, respectively.

19. A blood pump comprising an impeller and a driving device, the driving device comprising:
- a housing assembly comprising a limiting surface;
- a rotating shaft rotatably mounted to the housing assembly and fixedly connected to the impeller;
- a rotor fixedly connected to the rotating shaft;
- a thrust member fixedly connected to at least one of the rotating shaft and the rotor, wherein the thrust member, the limiting surface, and the rotor are arranged along an axial direction of the rotating shaft, the thrust member is located between the limiting surface and the rotor, and the thrust member is configured to abut against the limiting surface; and
- a stator configured to drive the rotor to rotate, wherein the stator is capable of generating a magnetic thrust force against the rotor, and the magnetic thrust force enables the thrust member to abut against the limiting surface;
- wherein the impeller is fixedly connected to the rotating shaft, and the rotating shaft is configured to drive the impeller to rotate.

20. The blood pump according to claim 19, further comprising a cannula assembly, wherein the cannula assembly comprises a tube body and a plurality of spaced inserting sheets extending from an end of the tube body along an axial direction of the tube body, a liquid outlet is formed between two adjacent inserting sheets, the housing assembly is provided with sinking grooves, and ends of the inserting sheets away from the tube body are accommodated in the sinking grooves.

* * * * *